United States Patent
Terefe et al.

(10) Patent No.: US 12,523,774 B1
(45) Date of Patent: Jan. 13, 2026

(54) SENSOR BLOOMING DETECTION

(71) Applicant: Zoox, Inc., Foster City, CA (US)

(72) Inventors: Nehemia Girma Terefe, Foster City, CA (US); Noor Abdelmaksoud, Redwood City, CA (US); Kai Zhou, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 247 days.

(21) Appl. No.: 18/354,148

(22) Filed: Jul. 18, 2023

(51) Int. Cl.
| | |
|---|---|
| *G01S 17/931* | (2020.01) |
| *B60W 30/09* | (2012.01) |
| *B60W 60/00* | (2020.01) |
| *G01S 7/48* | (2006.01) |
| *G01S 7/481* | (2006.01) |

(52) U.S. Cl.
CPC .......... *G01S 17/931* (2020.01); *B60W 30/09* (2013.01); *B60W 60/0016* (2020.02); *G01S 7/4808* (2013.01); *G01S 7/4816* (2013.01); *B60W 2420/408* (2024.01)

(58) Field of Classification Search
CPC .............. G01S 17/931; G01S 17/4808; G01S 17/4816; B60W 30/09; B60W 60/0016; B60W 2420/408
USPC .......................................................... 701/23
See application file for complete search history.

(56) References Cited

U.S. PATENT DOCUMENTS

| | | | |
|---|---|---|---|
| 9,869,754 B1* | 1/2018 | Campbell | G01S 7/4814 |
| 11,619,725 B1* | 4/2023 | Meinke | G01S 17/48 356/4.01 |
| 12,204,033 B2* | 1/2025 | Li | G01S 7/4816 |
| 2013/0083201 A1* | 4/2013 | Takacs | G06T 7/33 348/169 |
| 2019/0391270 A1* | 12/2019 | Uehara | G01S 17/04 |
| 2021/0349185 A1* | 11/2021 | Schleuning | G01S 7/4815 |
| 2022/0035011 A1* | 2/2022 | Pacala | G01S 7/4815 |
| 2022/0099808 A1* | 3/2022 | Kamil | G01S 7/497 |
| 2022/0179077 A1* | 6/2022 | Scharf | G01S 7/4802 |
| 2023/0266450 A1* | 8/2023 | Maayan | G01S 7/484 356/5.01 |
| 2023/0408702 A1* | 12/2023 | Peter | G01S 17/89 |
| 2024/0111056 A1* | 4/2024 | Brinker | G01S 17/89 |
| 2024/0190452 A1* | 6/2024 | Mirkovic | G06V 20/58 |
| 2024/0319343 A1* | 9/2024 | Jaakkola | G01S 7/4815 |
| 2024/0345223 A1* | 10/2024 | Fabiny | G01S 7/4863 |
| 2024/0369686 A1* | 11/2024 | Richter | G01S 7/4808 |
| 2024/0426979 A1* | 12/2024 | Revadigar | G01S 7/4808 |
| 2025/0022287 A1* | 1/2025 | Banas | G01S 17/931 |

* cited by examiner

*Primary Examiner* — Andrew R Dyer
(74) *Attorney, Agent, or Firm* — EIP US LLP

(57) ABSTRACT

Techniques comprise receiving sensor data comprising first sensor data collected by a first lidar sensor and a second sensor data collected by a second lidar sensor of a vehicle. An object is detected based at least in part on the first sensor data and the second sensor data. A difference between the first sensor data associated with the object and the second sensor data associated with the object is determined, the difference corresponding with blooming of the first sensor data or the second sensor data. The vehicle is controlled based at least in part on the difference between the first sensor data and the second sensor data.

20 Claims, 12 Drawing Sheets

φ1

φ2

SENSOR BLOOMING DETECTION

BACKGROUND

A vehicle can use a number of different types of sensors to detect properties of the environment in which it is travelling. Autonomous vehicles in particular may use sensor measurements to make decisions about how to operate the vehicle. One type of sensor is a light detection and ranging, or "lidar", sensor. A lidar sensor can measure distances to visible surfaces by emitting light and measuring properties of light reflected from those surfaces. In some cases, a lidar sensor may rotate to provide a wider field of view than would be obtained with a fixed sensor.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
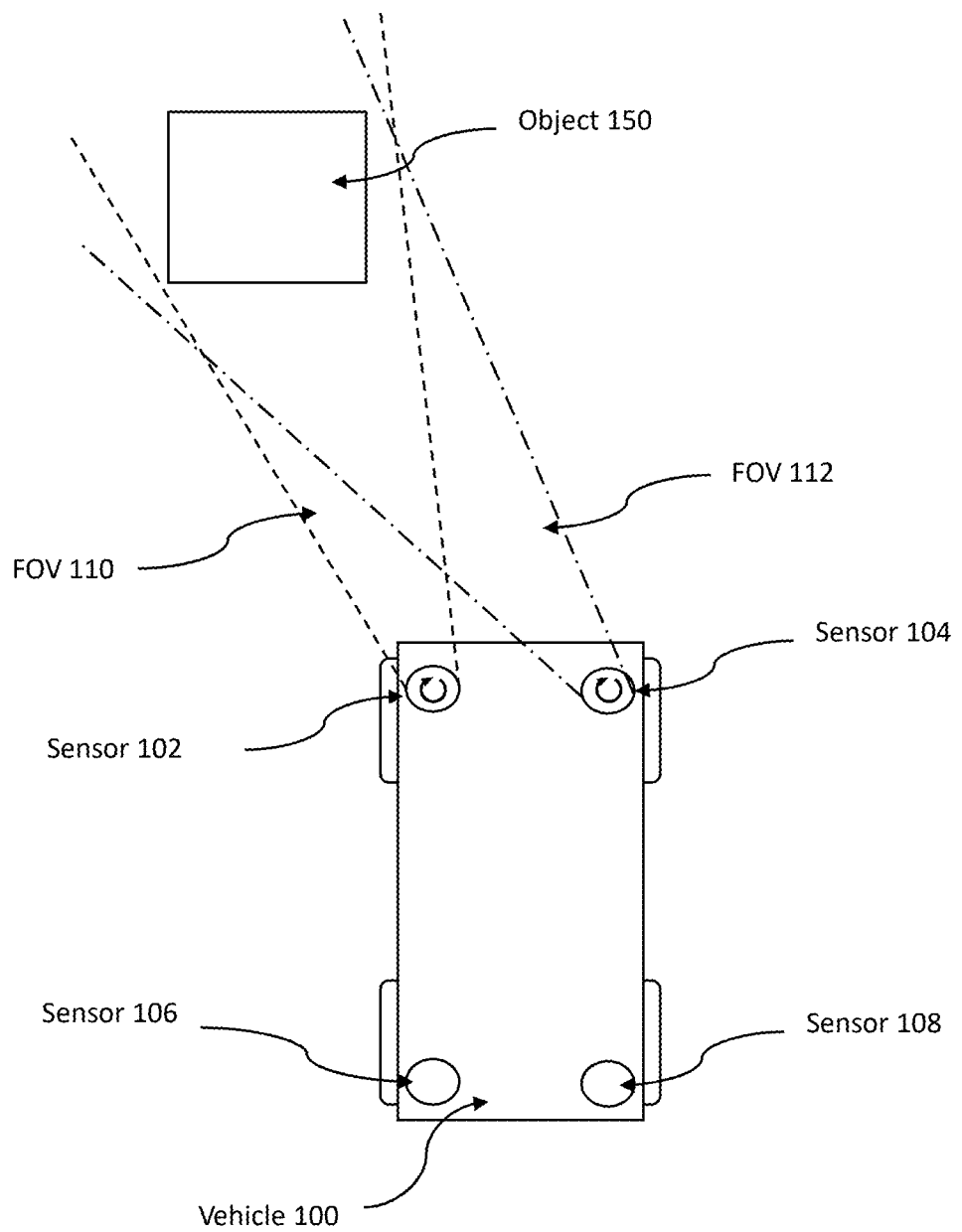
FIG. 1 is a schematic representation of a driving environment.

Techniques discussed herein may be used to detect occurrence of blooming in data collected by a sensor of a vehicle, such as a lidar sensor. As used herein, blooming may refer to the apparent distortion of objects measured by sensors such as lidars. In a non-limiting example, blooming may cause detected objects to appear larger than they are, spreading the detected surface across a larger area. Blooming may be a particular problem with high reflectivity objects, such as signs or road markings. Typically, a lidar sensor may comprise multiple photodetectors corresponding to different positions of detected objects. With high reflectivity objects, some reflected light may bleed into adjacent photodetectors. The sensor may interpret this bleeding as a real return from a different position to where the object actually is, causing the resulting image of the object to appear larger than it actually is. When control of the vehicle is based at least in part on the sensor data, apparent distortion of detected objects may reduce the accuracy of vehicle control. In a non-limiting example, the apparent extended object size caused by blooming may appear to the vehicle control systems as an object to be avoided, leading to sudden braking or direction changes. Such sudden changes may be energetically inefficient, uncomfortable for the occupants of the vehicle, inefficient, and may be unsafe. Techniques of the present invention seek to detect occurrence of blooming, and control the vehicle accordingly.

In some examples, techniques may comprise receiving sensor data from multiple sensors, such as lidar sensors. For example, techniques may comprise receiving sensor data comprising first sensor data collected by a first scanning sensor and a second sensor data collected by a second scanning sensor of a vehicle. As used herein, a scanning sensor may refer to a sensor that collects data about the surrounding environment by sweeping across a field of view of the sensor. For example a scanning sensor may be a mechanical lidar sensor. The sensors may be additionally or alternatively arranged to detect from overlapping fields of view (e.g., as a solid-state sensor). The sensor data may comprise raw sensor data, or may comprise processed sensor data such as a point cloud. The techniques may comprise detecting an object based at least in part on the first sensor data and the second sensor data. For example the sensor data may be received by a perception component of the vehicle. The perception component may perform object detection, segmentation, and/or classification based at least in part on the sensor data. Alternatively the techniques may be performed before data is received by the perception component, such that the perception component only receives data that has been filtered to remove or flag returns associated with blooming. In other words, object detection etc. may be performed on the filtered data. The techniques may comprise determining a difference between the first sensor data associated with the object and the second sensor data associated with the object, the difference corresponding with blooming of the first sensor data or the second sensor data. In particular examples the difference may correspond with blooming extending in an azimuthal/horizontal direction, and/or extending in an elevational/vertical direction. Based on such a difference, occurrence of blooming may be identified. The vehicle may then be controlled based at least in part on the difference between the first sensor data and the second sensor data, or based at least in part on identifying occurrence of blooming. Thus by using two separate sensors, techniques of the present disclosure may actively detect and control for the occurrence of blooming in sensor returns. For example, sensor returns determined to be associated with blooming may be removed, yielding a more accurate representation of the object on which control of the vehicle may be based. Although generally described herein as relating to azimuthal positions, it is to be noted that the techniques described below may equally be applied to vertically extending blooming.

In some examples, the techniques may comprise identifying an area of overlap between the first sensor data and the second sensor data. For example, the area of overlap may be identified based on a range difference and/or an intensity difference associated with the sensor data. In a non-limiting example, the area of overlap may be identified based at least in part on identifying a portion of the first sensor data and a portion of the second sensor data where range to the object is substantially constant with azimuthal angle. The range to the object as determined from the portion of the first sensor data may match the range to the object as determined from the portion of the second sensor data, but in other examples there may be an offset between the determined ranges. Thus techniques of the present disclosure may identify both an area of overlap, and a difference, between the data from the two sensors. This may provide a signature which can be used to identify that blooming has occurred. Once, it is determined that the sensor data comprises returns associated with blooming, the sensor data may be filtered. For example, sensor returns associated with blooming may be removed or otherwise flagged as being associated with blooming. The vehicle may then be controlled based on this filtered sensor data.

In some examples, the identified difference may be a difference between an azimuthal extent associated with the object in the first sensor data and an azimuthal extent associated with the object in the second sensor data. Such a difference may comprise a readily detectable signature of blooming, which may provide a computationally simple technique for identifying blooming. Sensor returns associated with blooming may be removed based the different azimuthal extents, or a separate process may be used to refine the determination of which returns are associated with blooming. The latter approach may have the benefit of avoiding use of more computationally expensive approaches unless required.

In some examples, the identified difference (or a second identified difference) may be a difference between a first relationship relating range and azimuthal angle of the first sensor data and, a second relationship relating range and azimuthal angle of the second sensor data. For a real object, both sensors should at least approximately agree as to the range of the object, i.e. the distance between the vehicle (e.g. center of the vehicle) to the object, across a surface of the object. In some examples, a surface of an object can be assumed to be flat or can otherwise be characterized as corresponding to a surface geometry (e.g., by characterizing an object to which the surface belongs). However, false returns associated with blooming may show ranges that vary with azimuthal angle, and which vary differently for the respective returns of the two sensors. Such examples may be used to provide a signature indicative of blooming. Further, such examples may be used to identify an azimuthal region that is common between the two sensors, that may be associated with the real extent of the object. Such an azimuthal region may defined based at least in part on a range difference threshold. The range difference threshold may be determined based at least in part on intensity associated with returns of the first sensor data and/or second sensor data. Returns outside of the identified azimuthal region may be removed from the sensor data, so that they are not used to control the vehicle. In other words, techniques of the present disclosure may dynamically adapt based on properties of the actual returns to provide an accurate determination of the extent of an object, and therefore accurate control of the vehicle.

In some examples, techniques may identify presence of conditions that are associated with occurrence of blooming. In a non-limiting example, rain drops on a sensor may be associated with occurrence of blooming. By detecting raindrops or other obstruction, it may be determined that conditions likely to cause blooming are present. Accordingly, some examples may comprise detecting an obstruction between the vehicle and the object based at least in part on the first sensor data and/or the second sensor data. The obstruction may be water, such as water droplets. The obstruction may be other matter, such as dirt. The techniques may comprise detecting the obstruction on an exterior surface of a sensor, such as an outer lens of the sensor. Such techniques may be performed as an initial, triggering, process, before identifying a difference between data from the first sensor and second sensor. This may avoid the need to perform computationally complex processes. It may also increase the safety blooming detection and removal by providing an additional check that any detected difference is likely to be associated with blooming. For example, this may avoid sensor returns from real objects being wrongly deemed ignorable blooming.

The techniques discussed herein can improve a functioning of a computing device of a vehicle in a number of ways. For example, the techniques may provide for computationally efficient but accurate detection of blooming, and hence accurate determination of the real properties of detected objects. Planning and or prediction components of the vehicle system may then be provided with a more accurate representation of the environment on which to make decisions about vehicle control, reducing processing associated with correcting for false objects such as emergency braking or changes of direction. The techniques may also improve safety of the vehicle, providing improved control based on a more accurate representation of the environment and avoiding sudden control changes caused by blooming-induced false characterizations of objects.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another examples, the techniques can be utilized in an aviation or nautical context, or in any system configure to input data to determine movement associated with objects in an environment. Additionally, the techniques described herein can be used with real data (e.g., captured using sensor(s)), simulated data (e.g., generated by a simulator), or any combination of the two.

FIGS. 1 and 2 illustrate an example of blooming in sensor data measured by vehicle sensors. FIG. 1 shows a vehicle 100 traversing an environment. Vehicle 100 may for example be an autonomous or semi-autonomous vehicle. Vehicle 100 may comprise a plurality of lidar sensors 102-108. In the illustrated example, vehicle 100 comprises four lidar sensors 102-108. In other examples vehicle 100 may comprise two lidar sensors, or three lidar sensors, or any other number of lidar sensors. Although the examples described herein relate to lidar sensors, in other examples other sensors may be used. In particular, any range-detecting sensor may be used. Vehicle 100 may also comprise additional sensors, such as one or more cameras and/or ultrasonic sensors.

The lidar sensors 102-108 may mechanically rotate around a vertical axis of the vehicle 100. That is, the lidar sensors 102-108 may scan across a horizontal or azimuthal direction. The lidar sensors may detect light with a field of view (FOV). The lidar sensors may emit light and detect that light when reflected from objects, such as object 150. Static fields of view 110, 112 of lidar sensors 102 and 104 respectively are shown in FIG. 1. The static field of view 110, 112 represents the space detectable by the respective lidar sensor 102, 104 if the sensor was static, i.e. at a given point in time. The lidar sensors 102, 104 may be rotated to scan across a wider area, sweeping the static FOVs 110,112 across the azimuthal direction to detect a wider section of the environment. For example, lidar sensors 102, 104 may each rotate a full 360-degrees. Lidar sensors 102, 104 may rotate in the same or opposite directions. Although not illustrated in FIG. 1, lidar sensors 106, 108 may similarly rotate to sweep across respective fields of view. In some examples, only one or more inner components of the lidar sensors 102-108 may rotate. For example, a lidar sensor 102-108 may comprise a rotatable mirror that sweeps across the field of view.

As shown in FIG. 1, lidar sensors 102, 104 may have overlapping fields of view. That is, both lidar sensors 102, 104 may be able to detect light arriving from the same space, albeit not necessarily at the same time. In the illustrated example, an object 150 is within the field of view of both a first lidar sensor 102 and a second lidar sensor 104. For example, each lidar sensor 102, 104 may emit light in the directions represented by static FOVs 110, 112, and may each receive reflections of that light from the object 150. The distance from the vehicle 100 to the object 150 may be determined from the time between emission of a beam and receipt of the corresponding reflection. Sensors with an overlapping field of view are discussed in more detail in US 20210341583 A1, which is incorporated herein by reference in its entirety for all purposes.

The object 150 may be any object in an environment around a vehicle. For example the object 150 may be road furniture, such a road sign. The object 150 may be a road itself, or markings on a road. The object 150 may be another user of the driving environment, such as another vehicle, cyclist, or pedestrian. Object 150 may in particular examples present a substantially planar surface to the sensors 102, 104, and may be approximately characterized as a retroreflector.

Figure 2A:
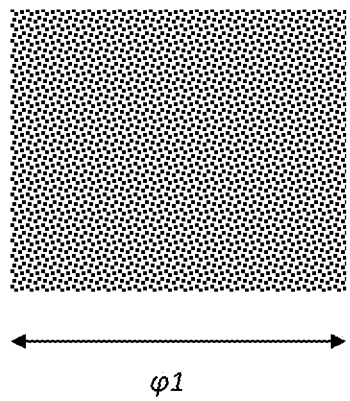
FIGS. 2A and 2B illustrate example point clouds derived from scanning sensor returns.
Figure 2B:
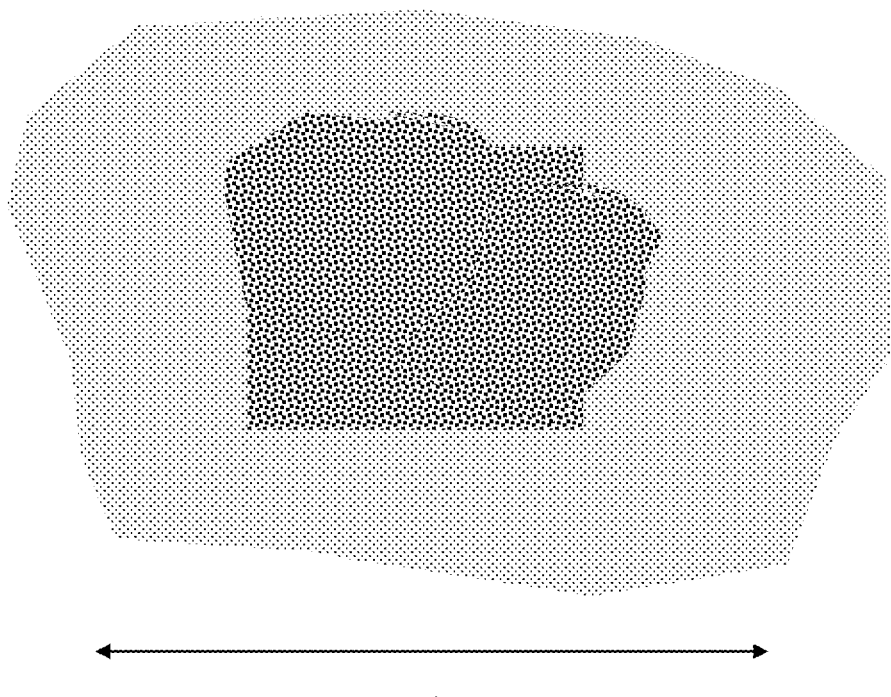

The lidar sensors 102, 104 may generate respective sensor data based at least in part on the light they detect. The raw sensor data may be processed into a point cloud, representing sensor returns from particular points in space. FIG. 2A illustrates the point cloud that would ideally be generated based on detecting object 150. The point cloud represents a plurality of sensor (e.g. lidar) returns that have been reflected from the object 150. The point cloud mirrors the actual shape of the object 150. However, in reality sensor data is unlikely to present such a clear, sharp representation of the object 150. Instead, some sensor returns will be collected from areas outside of the bounds of the object 150. This may particularly be the case where the object is highly reflective, as is the case for example for road signs. FIG. 2B illustrates a more realistic point cloud that may be determined from object 150. As can be seen, the representation of the object appears spread out compared to the actual shape of the object 150. This representation may comprise returns of greater intensity in the area approximately corresponding to the object 150, but may still receive other returns from an even wider area (represented in FIG. 2B by the lighter shading). A vehicle system, such as a perception component (e.g. the perception component of FIG. 10), attempting to characterize the object based on the point cloud of FIG. 2B may conclude that the object has an azimuthal extent $\varphi 2$, larger than the actual azimuthal extent $\varphi 1$ of the object 150. In other words, because of the spread of sensor returns the vehicle 100 may conclude that the object 150 is much larger than it really is, and may take action to control the vehicle based on this perceived larger size. For example, the vehicle 100 may falsely determine that the object 150 lies in its path, and so may take action such as braking to avoid the object 150.

Figure 3:
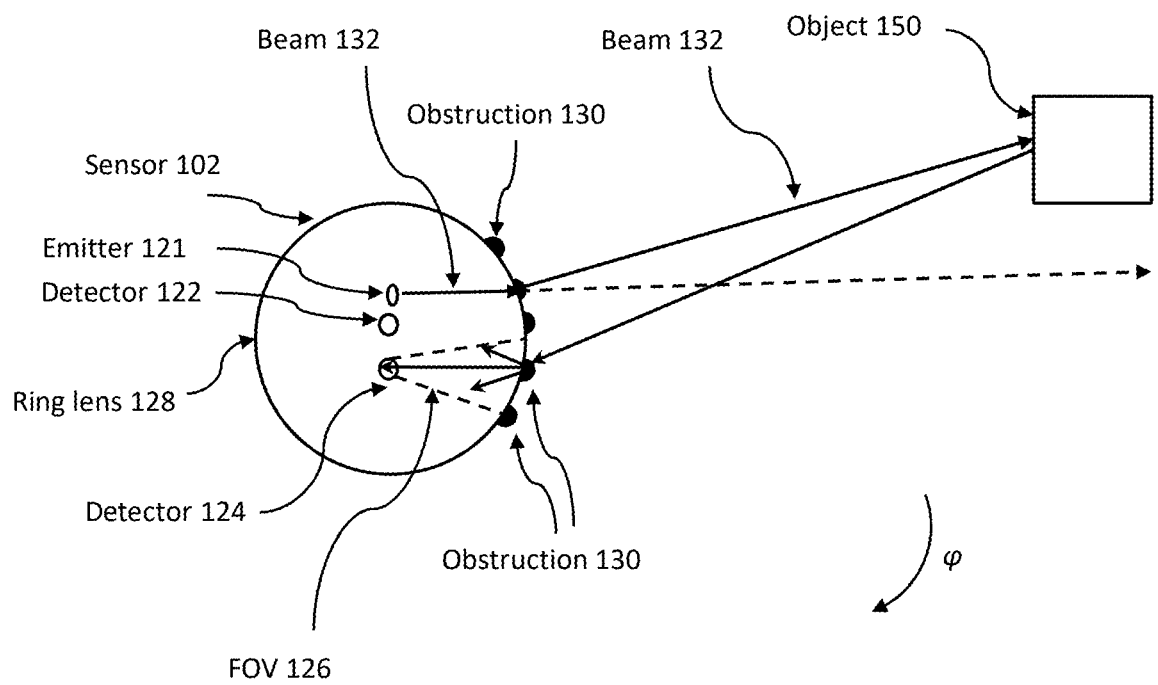
FIG. 3 schematically illustrates a sensor and occurrence of blooming.

The apparent spreading of the object 150 in FIG. 2B is caused by blooming. FIG. 3 illustrates an example of how blooming may occur. FIG. 3 illustrates an example of the sensor 102. In this example, sensor 102 comprises an emitter 121, a first detector 122, a second detector 124, and an outer ring lens 128. Each of the first detector 122 and second detector 124 may actually comprise a plurality of photodetectors, and so may in some examples be referred to as respective detector blocks. Each detector 122, 124, may be arranged to receive light from a different azimuthal position, or range of positions. The ring lens 128 may be a transparent (or partially transparent) outer component of the sensor 102, through which light can be emitted and received. The ring lens 128 provides an outer surface. In the illustrated example, there are a number of obstructions 130 on said outer surface of the ring lens. Obstructions 130 may for example be water droplets, for example from rain or dew, or dirt. Obstructions 130 may deflect light exiting the sensor 102. In the illustrated example, a beam 132 associated with the first detector 122 is emitted along a direction which should avoid the object 150 (represented by the broken arrow in FIG. 3). Beam 132 would is intended to be detected by detector 122. However, an obstruction 130 causes the beam 132 to be deflected such that it now hits object 150. Object 150 reflects the beam 132. The reflected beam may be detected by the detector 124. Thus, although the sensor 102 emitted a beam towards a position outside of the object 150, it still received a return suggesting presence of the object 150 at that point. The sensor 102 (or a perception component processing the raw sensor data) may therefore conclude that the object 102 extends further than it does.

The obstructions 130 may also deflect light entering the sensor 102. In the illustrated example, the reflection of beam 132 should avoid both the first detector 122 and second detector 124, and so should not cause a return to be recorded. However, the reflection in the illustrated example interacts with another obstruction 130 on the ring lens 128. The reflected beam is deflected into a field of view 126 of the second detector 124, and is detected.

Thus blooming may be caused by deflections resulting from obstructions on the exterior of a lidar sensor 102. The illustration of FIG. 3 relates primarily to blooming in an azimuthal/horizontal direction, but similar mechanisms can also cause blooming in vertical directions. However, in some examples of the techniques discussed below, azimuthal/horizontal blooming may be the primary consideration.

Figure 4A:
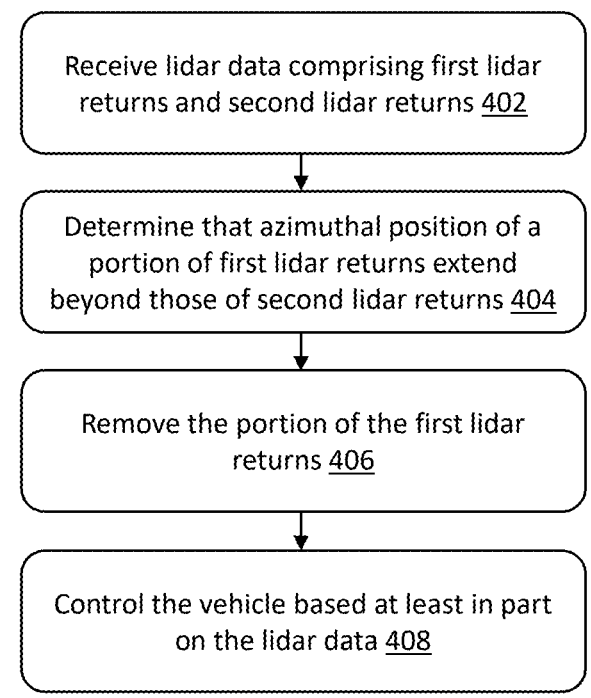
FIG. 4A is a flowchart illustrating a process according to techniques of the present disclosure.

FIG. 4A is a flow diagram representing an example computer-implemented process 400 according to the present disclosure. Process 400 may be used to identify that lidar data likely comprises blooming, and to remove lidar returns associated with blooming. Process 400 may be performed onboard systems of a vehicle, such as an autonomous vehicle. Process 400 may be implemented by a system comprising one or more processors and a memory storing instructions which, when executed by the one or more processors, cause the process 400 to be performed. Process 400 may be implemented on one or more computer-readable media storing instructions which, when executed by one or more processors, cause the process 400 to be performed. Process 400 may be implemented as a computer program comprising instructions which, when executed by a computer system, cause the process 400 to be performed. Process 400 (and the other processes described herein) may be implemented at a sensor-level of the vehicle's computer systems, that is before the data reaches a perception component. Alternatively, process 400 may be performed by a perception component, but before typical perception operations such as object detection are performed.

Process 400 may comprise operation 402, comprising receiving lidar data. The lidar data may comprise first lidar returns captured by a first lidar sensor of an autonomous vehicle and second lidar returns captured by a second lidar sensor of the autonomous vehicle. The first lidar sensor and second lidar sensor may be examples of any of the lidar sensors 102-108 illustrated in FIG. 1. The first and second lidar sensors may both scan across the same direction with respect to the vehicle. In particular, the first and second lidar sensors may both scan in an azimuthal direction, i.e. in a horizontal direction with respect to the vehicle.

The first lidar returns and second lidar returns may be associated with an object in an environment traversed by the autonomous vehicle. For example, the lidar returns may be or comprise reflections from the object, or positions proximal the object. The lidar returns may be interpreted or interpretable as associated with the object by a component of the vehicle, such as a perception component. Thus, for example, the lidar returns may comprise both 'real' returns from an object and returns associated with blooming from the object. The object may be similar to object 150. For example, the object may be road furniture such as a road sign, road markings, a road surface, another vehicle, a cyclist, or a pedestrian. Operation 402 may be performed by a perception component of the vehicle, such as a perception component as described below in relation to FIG. 10.

Figure 5:
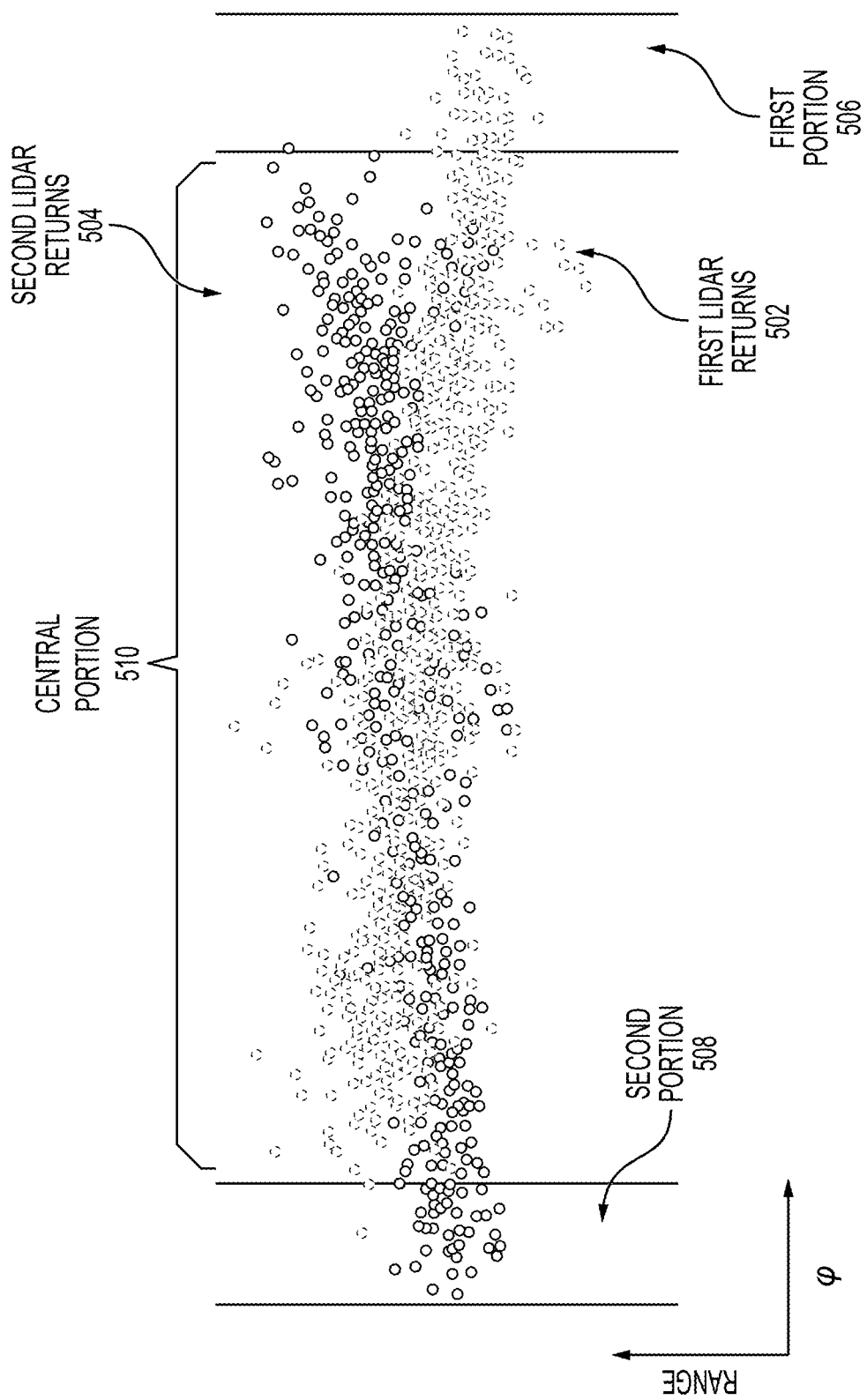
FIG. 5 shows an example of lidar data illustrating azimuthally extending portions.

Process 400 may comprise operation 404. Operation 404 may also be performed by the perception component of the vehicle. Operation 404 may comprise determining that azimuthal positions of a portion of the first lidar returns extend beyond azimuthal positions of the second lidar returns. An example of such an extended portion of lidar returns is illustrated in FIG. 5. FIG. 5 shows first lidar returns 502 from the first lidar sensor, and second lidar returns 504 from the second sensor. The x-axis of FIG. 5 represents the azimuthal or horizontal direction. The y-axis of FIG. 5 represents the range to the object. The range may be determined for example from the time-of-flight associated with each lidar return.

In the illustrated example, a first portion 506 of first lidar returns 502 extends further than the second lidar returns 504 along the azimuthal direction. Similarly in this example, a second portion 508 of second lidar returns 502 extends beyond the first lidar returns. Both first lidar returns 502 and second lidar returns 504 are returned within an azimuthal central portion 510. Such a pattern of lidar returns 502, 504 may be indicative of the presence of blooming. In particular, such a pattern of the second lidar returns 'starting earlier' and/or 'ending earlier' in the azimuthal direction may be indicative of blooming when the object is closer to the first lidar sensor. If, on the other hand, the object was closer to the second lidar sensor, the opposite pattern may be observed—the first lidar returns 502 'starting' and/or 'ending' azimuthally earlier than the second lidar returns 504. The effect may be magnified as the distance between the vehicle and the object decreases. Thus examples may determine which lidar sensor the object is closest to, and confirm that the extended portion(s) are the expected azimuthal sides to correspond to blooming. This may be considered a type of parallax effect, artificially extending the apparent size of the object. Notably, this pattern is the opposite to what would be expected simply from one sensor seeing an object before the other. Thus by identifying that a portion of one or both lidar returns 502, 504 extends azimuthally beyond the other, it may be determined that blooming is occurring.

The first portion 506 may be identified as those first lidar returns 502 in an azimuthal region where no second lidar returns are detected. In other examples, the first portion 506 may be identified as those first lidar returns 502 in an azimuthal region where only a predefined proportion of second lidar returns are detected. For example, it may be the region where 5% or less, or 2% or less, or 1% or less of second lidar returns are detected. The second portion 508 may be similarly defined.

In some examples, the first and second lidar returns 502, 504 may be provided to a pattern recognition algorithm configured to determine whether blooming is likely. The pattern recognition algorithm may for example be a machine learned model trained to recognize patterns of azimuthal extents associated with blooming. The machine learned model may comprise one or more neural networks. For example, the machine learned model may be a classifier model trained to classify lidar returns as comprising blooming or not. Such examples may be used to detect presence of blooming, but not to remove the blooming. Other techniques, such as the process 600 discussed below, may then be applied to remove the blooming. Some examples may identify an azimuthal variation between ranges to the object associated with the first lidar returns and ranges to the object associated with the second lidar returns, as discussed further below. The illustrated process 400, however, may remove lidar returns from the lidar data that are associated with blooming based on the azimuthal extent pattern.

Process 400 may comprise operation 406. Operation 406 may comprise removing the first portion 506 of the first lidar returns 502 from the lidar data. Additionally or alternatively, operation 406 may comprise removing the second portion 508 of the second lidar returns 504 from the lidar data. Removing the portion/s 406, 408 may comprise deleting the lidar returns 502. 504 associated with the respective portion 506, 508, or otherwise identifying them as associated with blooming to be ignored in further processing of the lidar data. Thus in some examples, the lidar data associated with the objected may be updated to include only the central portion 510 of the lidar data. The central portion 510 may provide at least an improved approximation of the true azimuthal extent of the object, compared to the original lidar data. Operation 406 may be performed by the perception component of the vehicle.

Process 400 may comprise operation 408. Operation 408 may comprise controlling the autonomous vehicle based at least in part on the updated lidar data, i.e. the lidar data with the portion/s 406, 408 removed or otherwise identified as associated with blooming. For example, the updated lidar data may be provided to a planning and/or prediction components of the vehicle by the perception component. The planning component may determine one or more trajectories for the vehicle based at least in part on the lidar data, and in particular based at least in part on the identification of the object from the lidar data. The prediction component may predict future behavior of one or more dynamic objects in the environment. By removing the extended portion/s 506, 508 from the lidar data, the planning and/or prediction components may be provided with a more accurate representation of the object on which to make decisions.

Figure 4B:
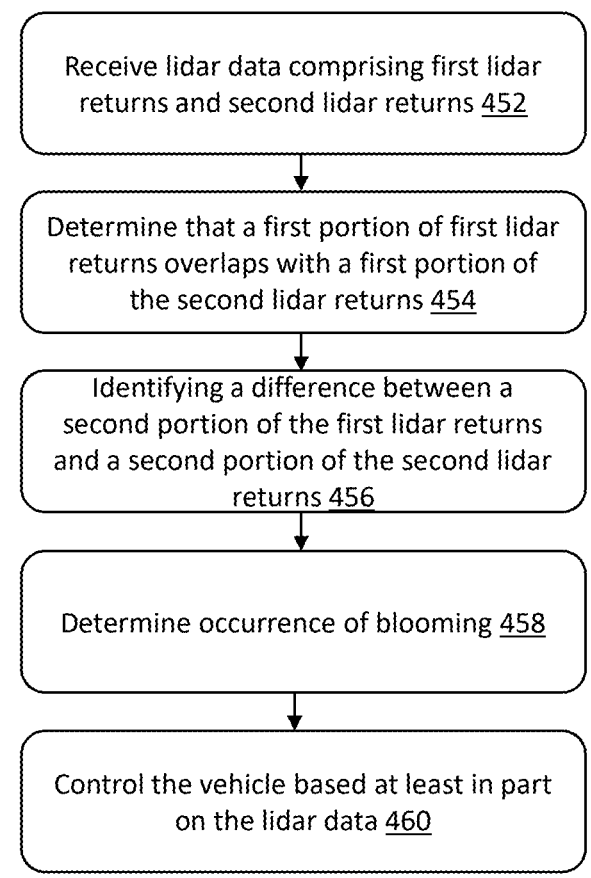
FIG. 4B is a flowchart illustrating a process according to techniques of the present disclosure.

FIG. 4B is a flow diagram representing an example computer-implemented process 450 according to the present disclosure. Process 450 may be used to identify that lidar data likely comprises blooming, and to control the vehicle accordingly. Process 450 may be performed onboard systems of a vehicle, such as an autonomous vehicle. Process 450 may be implemented by a system comprising one or more processors and a memory storing instructions which, when executed by the one or more processors, cause the process 450 to be performed. Process 450 may be implemented on one or more computer-readable media storing instructions which, when executed by one or more processors, cause the process 450 to be performed. Process 450 may be implemented as a computer program comprising instructions which, when executed by a computer system, cause the process 450 to be performed.

Process 450 may comprise operation 452, comprising receiving lidar data comprising first lidar returns captured by a first lidar sensor of an autonomous vehicle and second lidar returns captured by a second lidar sensor of the autonomous vehicle. The first lidar returns and second lidar returns may be associated with an object in an environment traversed by the autonomous vehicle. Operation 452 may be the same as operation 402 discussed above.

Process 450 may comprise operation 454, comprising determining that a first portion of the first lidar data overlaps, as overlapping data, with a corresponding (e.g. having corresponding azimuthal/elevation positions) first portion of the second lidar data corresponding to an object. For example, operation 454 may comprise identifying the central portion 510 as discussed above. That is, identifying the overlapping data may comprise identifying lidar data in an azimuthal (or elevational) range in which there is both first lidar data and second lidar data associated with the object. Alternatively or additionally, identifying the overlapping data may comprise identifying the central region 710, as discussed below in relation to FIG. 7B. That is, identifying the overlapping data may comprise identifying an azimuthal (or elevation) region in which the range to the object as determined from the first lidar data is approximately the same as the range to the object as determined from the second lidar data (or a region where there is a constant offset between the range determined from the two groups of data). In some examples, identifying the overlapping data may comprise identifying a region of the first lidar data and the second lidar data in which the respective ranges determined from the two sets of lidar data is approximately constant as azimuthal (or elevational) angle varies.

Process 450 may comprise operation 456, comprising identifying a difference between a second portion of the first lidar returns and a corresponding second portion of the second lidar returns. The difference may comprise a range difference. i.e. a difference between the range to the object determined from the first lidar returns and the range to the object determined from the second lidar returns (e.g. as in the areas outside of the central region 710 in FIG. 7B). The difference may comprise a variation of range as a function of azimuth or elevation. For example identifying the difference may comprise identifying the first relationship 706 and/or second relationship 708 discussed below in relation to FIG. 7A. In some examples the difference may comprise a difference in azimuthal or elevational extent of the first lidar returns and second lidar returns associated with the object. For example, identifying the difference may comprise identifying the first portion 506 and/or second portion 508 discussed above.

Process 450 may comprise operation 458, comprising determining, based at least in part on the overlapping data and the difference, that the second portion of the first lidar returns and/or the second portion of the second lidar returns (i.e. the returns associated with the difference) correspond to blooming. In some examples, the lidar data may be filtered based at least in part on this determination. For example, returns may be removed or otherwise flagged as associated with blooming. Lidar data may in some examples be filtered based on a range difference (i.e. range to the object) between first lidar returns and corresponding second lidar returns. In some examples, the second portion of the first lidar returns and/or the second portion of the second lidar portions may be filtered. In other examples, however, a separate process may be used to determine which lidar returns to filter. For example, once it has been determined that blooming has occurred, the range difference between a first lidar returns and a second lidar return may be compared to a threshold. If the range difference exceeds the threshold, the pair of first lidar return and second lidar return may be filtered. A first lidar return may correspond to a second lidar return if it is associated with the same azimuthal (and/or elevational) position. Alternatively or additionally, lidar returns may be filtered based on an intensity of the returns, as discussed in more detail below in relation to FIG. 7C. All returns may be processed by such approaches. Therefore, such techniques may provide a first step of detecting blooming, and a second step of removing the blooming.

Process 450 may comprise operation 460, comprising controlling the autonomous vehicle based at least in part on the second portion of the first lidar returns and/or second portion of the second lidar returns corresponding to blooming. That is, the vehicle may be controlled based at least in part on having determined that blooming has occurred. In examples in which the lidar data is filtered, as above, the vehicle may be controlled at least in part on the filtered lidar data.

Figure 6:
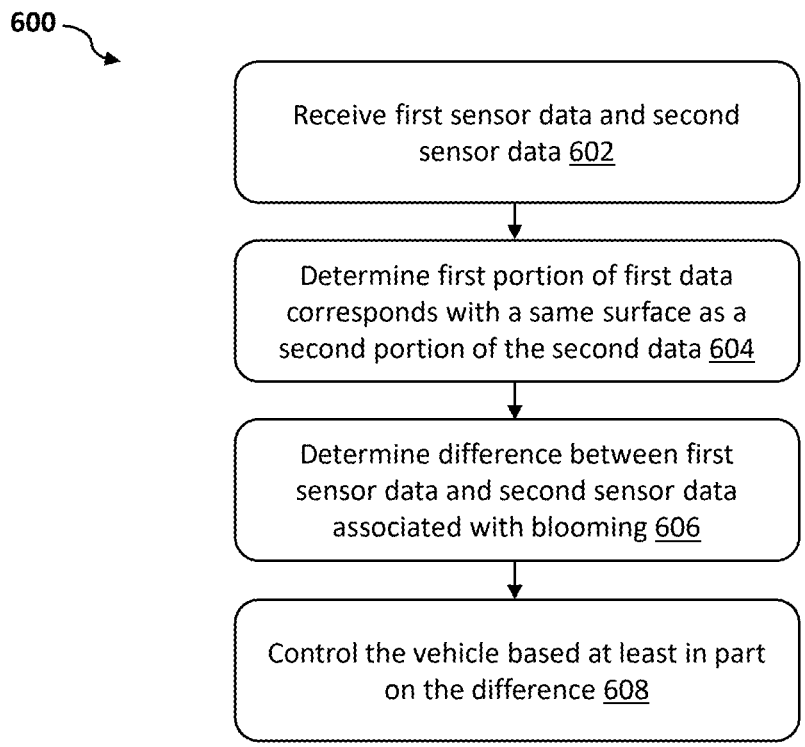
FIG. 6 is a flowchart illustrating a process according to techniques of the present disclosure.

FIG. 6 is a flow diagram representing an example computer-implemented process 600 according to the present disclosure. Process 600 may be used to identify that lidar data likely comprises blooming, and to remove lidar returns associated with blooming. Process 600 may be performed onboard systems of a vehicle, such as an autonomous vehicle. Process 600 may be implemented by a system comprising one or more processors and a memory storing instructions which, when executed by the one or more processors, cause the process 600 to be performed. Process 600 may be implemented on one or more computer-readable media storing instructions which, when executed by one or more processors, cause the process 600 to be performed. Process 600 may be implemented as a computer program comprising instructions which, when executed by a computer system, cause the process 600 to be performed.

Process 600 may comprise operation 602. Operation 602 may comprise receiving sensor data comprising first sensor data collected by a first scanning sensor and a second sensor data collected by a second scanning sensor of a vehicle. As described above, a scanning sensor may be a sensor which sweeps (e.g. rotates) across a field of view to capture information about its environment. The first scanning sensor and second scanning sensor may mechanically sweep across respective fields of view. The respective fields of view may at least partially overlap. It is noted that a partially overlapping field of view does not mean that the first scanning sensor and the second scanning sensor must both sense from the same point in space at the same time. In some examples, one or both of the first scanning sensor and the second scanning sensor may be a lidar sensor.

The first sensor data and/or second sensor data may be raw sensor data, for example data as directly measured by the first scanning sensor and second scanning sensor prior to any processing. Alternatively the first sensor data and/or second sensor data may be pre-processed, for example forming respective point clouds of sensor returns. The sensor data may be received at a component of the vehicle configured to analyze sensor data to identify or characterize features of the environment around the vehicle, such as a perception component of a vehicle.

As illustrated in the example sensor 102 of FIG. 2, the first scanning sensor and/or second scanning sensor may comprise a first photodetector and a second photodetector arranged to detect light reflected from objects in an environment around the vehicle with respective fields of view. The first photodetector may be positioned within a distance of the second photodetector such that a portion of light travelling within the field of view of the first sensor is deflected by an obstruction into the field of view of the second photodetector. The obstruction may be a water droplet (e.g, from rain or dew), or other matter such as dirt. Thus, the first sensor and/or second sensor may be susceptible to blooming, obscuring the true characteristics of objects detected from the sensor data.

Process 600 may comprise operation 604. Operation 604 may comprise determining that a first portion of the first lidar data corresponds with a same surface as a second portion of the second lidar data. For example, both portions may correspond with the same surface of an object ahead of the vehicle. Determining the portions correspond to the same surface may comprise comparing positions and/or ranges associated with the returns of the first sensor data and second sensor data to identify returns from a same surface. Determining that the portions correspond to the same surface may comprise identifying an area of overlap between the first lidar data and the second lidar data. The area of overlap may extend in a horizontal (or azimuthal) direction and/or a vertical direction. The area of overlap may be the central portion 510 or central region 710 discussed below. Alternatively or additionally, determining that the first portion and second portion Operation 604 may be performed by a perception component of the vehicle, such as the perception component described below in relation to FIG. 10

Process 600 may comprise operation 606. Operation 606 may comprise determining a difference between the first sensor data associated with the object and the second sensor data associated with the object. Sensor data associated with the object may for example comprise returns deemed to be reflected from the object, for example by a perception component of the vehicle. The difference may correspond with blooming of the first sensor data and/or the second sensor data. In particular examples, the difference may correspond with blooming extending in an azimuthal direction, and/or in a direction substantially parallel to a direction of scanning/sweeping of the first scanning sensor and the second scanning sensor. The first scanning sensor and second scanning sensor may be separated from each other along this direction. Operation 606 may for example be performed by the perception component. In some examples, process 600 may further comprise identifying occurrence of blooming based at least in part on determining the difference. Other examples may comprise identifying occurrence of blooming based at least in part on determining the difference and based at least in part on identifying an area of overlap between the first data and second data. The area of overlap may for example be the central region 710 discussed below. For example, determining that there is both a difference and an area of overlap may provide a signature indicative of blooming.

In some examples, the difference identified in operation 606 may be a difference between an azimuthal extent associated with the object in the first sensor data and an azimuthal extent associated with the object in the second sensor data. Thus for example operation 606 may identify the first portion 506 and/or second portion 508 illustrated in FIG. 5. Accordingly, operation 606 may be similar to operation 404 described above.

Alternatively or additionally, in some examples identified in operation 606 may be a difference between a first relationship between range and azimuthal angle of the first sensor data and, a second relationship between range and azimuthal angle of the second sensor data. Such a difference may be identified after identifying the difference in azimuthal extent. For example azimuthal extent difference may be used as an initial check that blooming is likely to exist. In some such examples, the first portion 506 and/or second portion 508 may be removed from the data, such that the difference between the first and second relationship is identified from only the central portion 510 where both first lidar returns and second lidar returns are detected. Other examples may omit identifying a difference in azimuthal extent, and instead proceed directly to identifying a difference between the first relationship and second relationship.

Figure 7A:
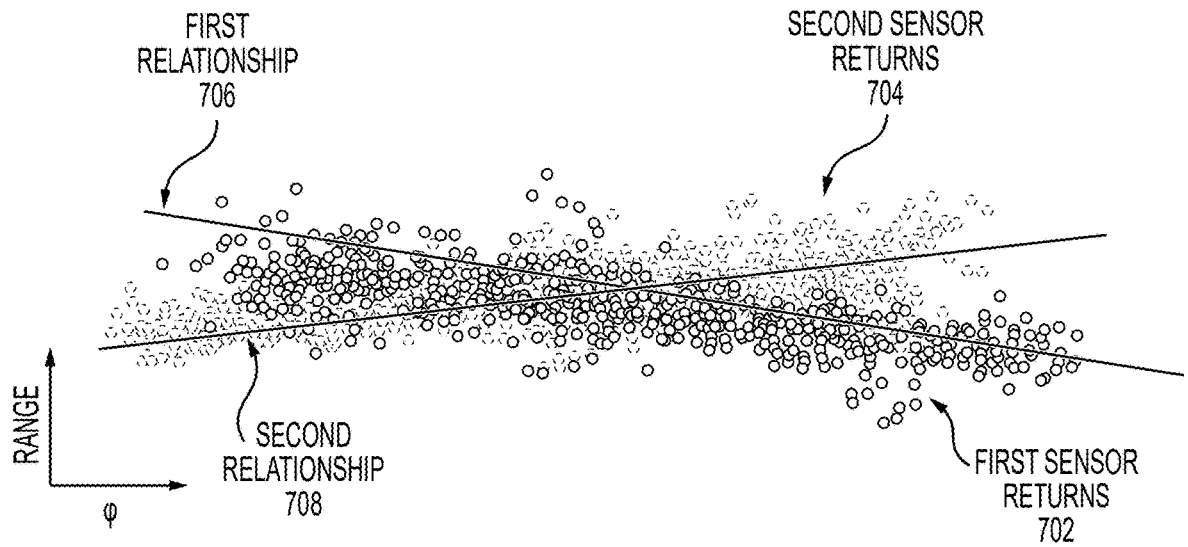
FIGS. 7A-7C show example lidar data associated with the process of FIG. 6.
Figure 7B:
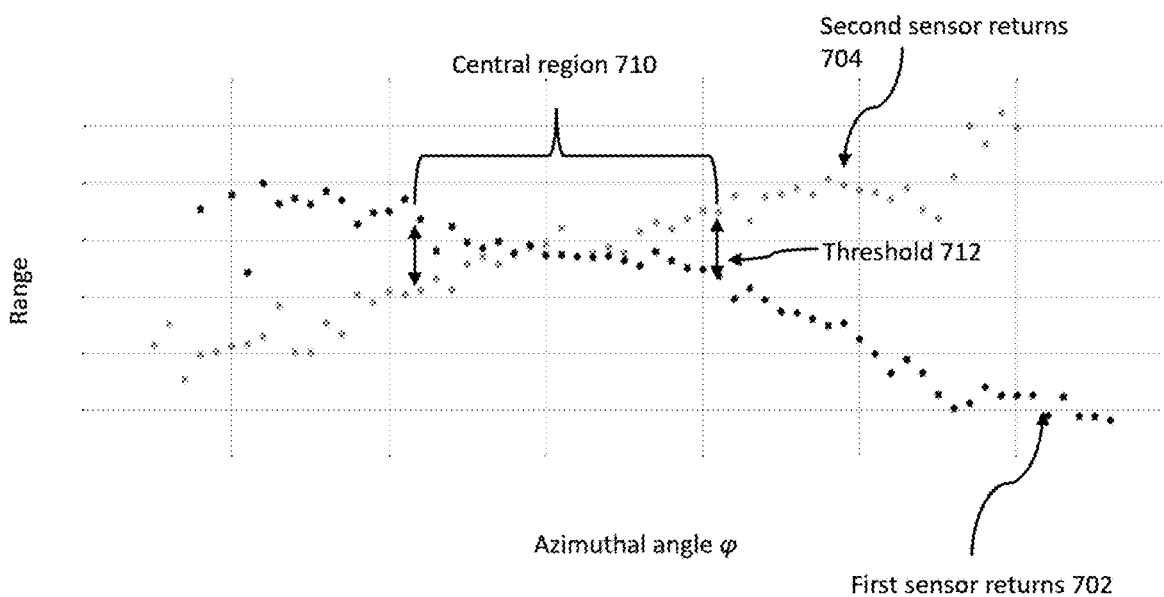

FIGS. 7A and 7B illustrate examples of identifying relationships between range and azimuthal angle for example sensor data associated with a planar object. FIG. 7A shows first sensor returns 702 from a first sensor and second sensor returns 704 from a second sensor. The x-axis of FIG. 7A represents the azimuthal angle associated with the sensor returns 702, 704. The y-axis of FIG. 7A represents the range (i.e. distance information) associated with the sensor returns 702, 704. Range for a sensor return 702, 704 may be calculated for example based on a time-of-flight associated the return.

FIG. 7A illustrates a first relationship 706 between range and azimuthal angle of the first sensor returns. FIG. 7A also illustrates a second relationship 708 between range and azimuthal angle of the second sensor returns. The first relationship 706 and second relationship 708 may be a function representing the respective range to azimuth relationships. The relationships 706, 708 may be lines of best fit representing the respective range to azimuth relationships. The relationships 706, 708 may for example be determined by a regression technique.

In some examples, a gradient of the first relationship 706 has a direction opposite to a gradient of the second relationship 708. In the example illustrated in FIG. 7A, the first relationship 706 has a negative gradient (range decreases as azimuthal angle increases), whereas the second relationship 708 has a positive gradient (range increases with azimuthal angle).

For a real object presenting a face to the scanning sensors, it may be expected that range from the vehicle to the object would be approximately constant across the full azimuthal extent of the object. In contrast, the range associated with the sensor data of FIG. 7A varies with azimuthal angle. This variation may be a signature of blooming. Thus, operation 606 of process 600 may comprise identifying such a variation. If such a variation is identified, the vehicle may then be controlled with the knowledge that the sensor data contains false returns caused by blooming. This signature of blooming may be identified for example by providing the sensor data to a machine learned model trained to identify blooming. The machine learned model may have been trained based at least on a training set comprising first and second sensor data exhibiting a variation of range with azimuth, and in particular with opposite gradient directions. In alternative methods a non-machine learning algorithm may calculate the first and second relationships 706, 708, and may then compare the determined relationships 706, 708 to identify the difference.

In additional to identifying the overall variation range as a function of azimuth in the first sensor returns 702 and second sensor returns 704, some examples may identify a central region in which the first relationship and the second relationship overlap (i.e. identify an overlapping area). In some examples, this may comprise identifying an azimuthal region in which ranges associated with the first lidar returns or ranges associated with the second lidar returns are substantially independent of azimuthal angle. FIG. 7B illustrates such a central region 710. That is, the overlapping area may be an area in which the range determined from the first lidar returns is approximately constant; and the range determined from the second lidar returns is approximately constant; but the two range values need not agree. This may account for calibration differences between the two sensors, for example.

FIG. 7B shows averages of the first sensor returns 702 and second sensor returns 704 from FIG. 7A. For example, bins of azimuthal angles may be defined. For each bin, the ranges of first sensor returns 702 associated with azimuthal angles within that bin may be averaged to yield an averaged return (and similarly for the second sensor returns 704). FIG. 7B plots the averaged returns for each bin. From these averages, it is clearer than in FIG. 7A to see that there is a central region 710 in which the first sensor returns 702 and second sensor returns 704 approximately agree on the range to the object, and the range is approximately constant across the central region 710. As discussed above, it may be expected that a real planar object would yield an approximately constant range across its full azimuthal extent. The central region 710 may therefore correspond, at least approximately, to the real azimuthal extent of the object. Returns lying outside of the central region 710 may be considered to be associated with blooming. It is noted that although some examples may average returns 702, 704 in the manner illustrated in FIG. 7B, other examples may identify the central region 710 directly from the sensor returns 702, 704 without averaging.

Some examples may identify the pattern of the central region 710 without specifically defining the bounds of the central region. Other examples however may identify specific bounds of the central region 710. For example, the central region 710 may be identified based at least in part on comparing a (modulus of) range difference between a return of the first sensor data and a corresponding return of the second sensor data to a threshold range difference 712. The azimuthal values corresponding to the threshold ranges difference may then be deemed to define the bounds of the central region 710. For example, the ranges of the second sensor returns 704 may be subtracted from the corresponding ranges of the first sensor returns 702 (or averages thereof, as in FIG. 7B) to yield a range difference as a function of azimuthal angle. The bounds of the central region 710 may then be defined as the azimuthal angles associated with the range differences matching or closest to the size of the threshold range difference 712. In some examples one or both of the first sensor returns and second sensor returns 702, 704 may comprise a range offset, for example due to a miscalibration of the first scanning sensor and/or second scanning sensor. Thus some examples may deduct an offset value, or respective offset values, from the first sensor returns 702 and/or second sensor returns 704 prior to comparing the range differences to the threshold range difference 712. Equivalently, the threshold range difference 712 may be adjusted to account for offsets, for example by using separate upper and lower threshold range differences with different values.

In some examples, the threshold range difference 712 may be a predefined value. For example, the threshold range difference may be 10 cm or less, or 5 cm or less, or 2 cm or less. In other examples, the threshold range difference 712 may by dynamically determined. For example, the threshold range difference 712 may be determined based at least in part on intensities of the first and/or second sensor returns 702, 704. In particular, the threshold range difference 712 may be determined based at least in part on a variation of intensity associated with first and/or second sensor returns 702, 704 with respect the range difference between the first sensor returns 702 and the second sensor returns 704.

Figure 7C:
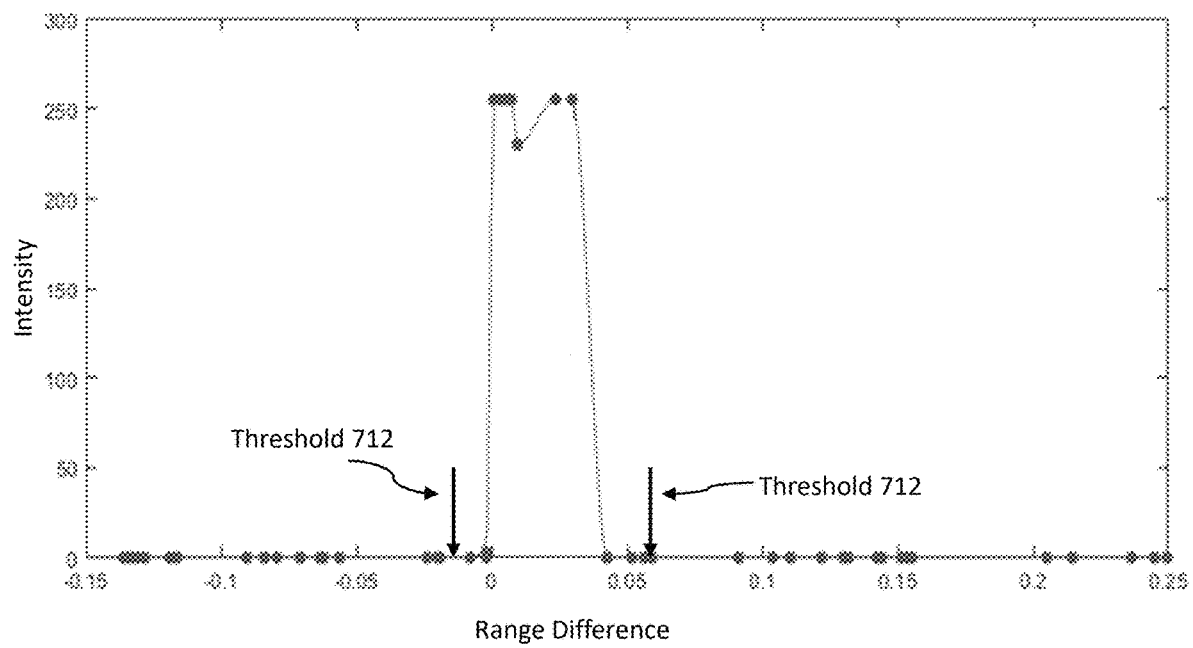

FIG. 7C illustrates example sensor returns with associated intensities shown as a function of range difference. For example, bins of range differences may be defined. The intensity of first and/or second sensor returns 702, 704 associated with each range difference bin may be averaged to yield the intensities shown in FIG. 7C. Alternatively the highest intensity of each corresponding pair of first sensor return and second sensor return may be used. As can be seen in this example, the intensities of sensor returns 702, 704 in the region with small threshold difference is high, with a sharp drop in intensity as range difference increases. It may be expected that the most intense sensor returns will be those that have reflected directly from the surface of the object. Returns associated with blooming may have much lower intensities, for example because the deflected light paths associated with blooming are less likely to occur than direct retroreflections. High intensity returns may therefore be associated with real, non-blooming returns, and hence the actual dimensions of the object. Thus considering the example of FIG. 7C, it may be determined that the range differences associated with high intensity correspond to non-blooming returns, whereas the low intensity range difference regions may correspond to blooming returns. In other words, the high intensity region may correspond with the central region 710. Thus the intensity pattern may be used to determine the threshold range difference 712 used to define the azimuthal bounds of the central region 710. For example, range differences associated with a drop in intensity of a fixed amount relative to a maximum intensity may be identified as the or a threshold range difference threshold 712. The fixed amount may for example be 50% or more, or 75% or more, or 90% or more. Alternatively, as in the illustrated example, the threshold range differences 712 may be determined as a set distance after a drop in intensity. As also shown in the example of FIG. 7C, the range differences associated with the intensity drops may not be symmetrical around a zero range difference. This may be caused by a range miscalibration of one or both scanning sensors. To account for this, some examples may define a lower threshold range difference 712 and an upper threshold range difference 712 to be used in defining the central region 710. Such dynamic determinations of the threshold range difference(s) 712 may be performed at every processing tick (e.g. for each generated point cloud of sensor data), or for only a subset of ticks. For example new threshold range differences 712 may be determined periodically, or only on startup of the vehicle.

Additionally or alternatively, bounds of the central region 710 may be determined directly based on intensity of returns of the first and/or second sensor returns, without the comparison to range threshold. For the same reasons as discussed above, it may be expected that more intense returns are real, non-blooming returns. Thus intensity of returns as a function of azimuthal angle may be considered. The azimuthal bounds of the central region 710 may be identified based on a drop in intensity as a function of azimuthal angle, and/or a gradient of intensity as a function of azimuthal angle. Alternatively or additionally, a similar approach may be used to define bounds in the vertical direction, for example using intensity to define bounds on a central region of elevation angle. Thus a 2D region may be defined between azimuthal angle and elevation angle bounds which may correspond closely to the true bounds of the object without noise from blooming.

In some examples, identifying the central region 710 may be used only to provide further confirmation that blooming is occurring. Utilizing multiple confirmations of blooming may provide improved confidence that some returns are associated with blooming and can be ignored, ensuring safety by avoiding removal of lidar points associated with real object. In other examples, however, identifying the central region 710 may be used to refine the sensor data to correspond to the actual object. For example, the central region 710 may be identified as the azimuthal extent of the object. This identification may be provided to a planning component of the vehicle along with the set of sensor data, in order for the planning component to control the vehicle with knowledge of the true azimuthal extent of the object. In other examples, returns associated with the object but falling outside of the central portion 710, and thus likely associated with blooming, may be removed from the first and/or second sensor returns. The reduced set of first and/or second sensor returns may be processed for example by a perception component of the vehicle to re-identify the object with a more accurate characterization of its dimensions than when blooming returns were included. In yet other examples, a separate step of filtering the data may be performed after it is determined, e.g. based on detecting the first and second relationships 706, 708 and/or central region 710, that blooming has occurred. This step of filtering may comprise comparing the range difference between corresponding first and second lidar returns to a range difference threshold. All corresponding pairs of points may be processed in this way. A first lidar return may correspond to a second lidar return if it is associated with the same azimuthal and/or elevational position. In other words, the filtering may be applied to the full 2D set of data, even if only azimuthal variations are considered when identifying that blooming has occurred. Although generally described above as comparing first and second returns on a point-wise basis, other examples may group plural first returns and plural second returns, and compare corresponding groups of returns.

Returning to FIG. 6, process 600 may further comprise operation 600. Operation 600 may comprise controlling the vehicle based at least in part on the difference between the first sensor data and the second sensor data. For example, the object may be identified, characterized, or classified based on the difference, such as by a perception component. Such information may then be provided to a planning component of the vehicle, which may generate one or more trajectories for the vehicle to follow based at least in part on that information. Thus by removing blooming, or at least identifying returns associated with blooming by the methods discussed above, a more accurate representation of the object may be determined by the perception component, yielding improved control of the vehicle.

Figure 8:
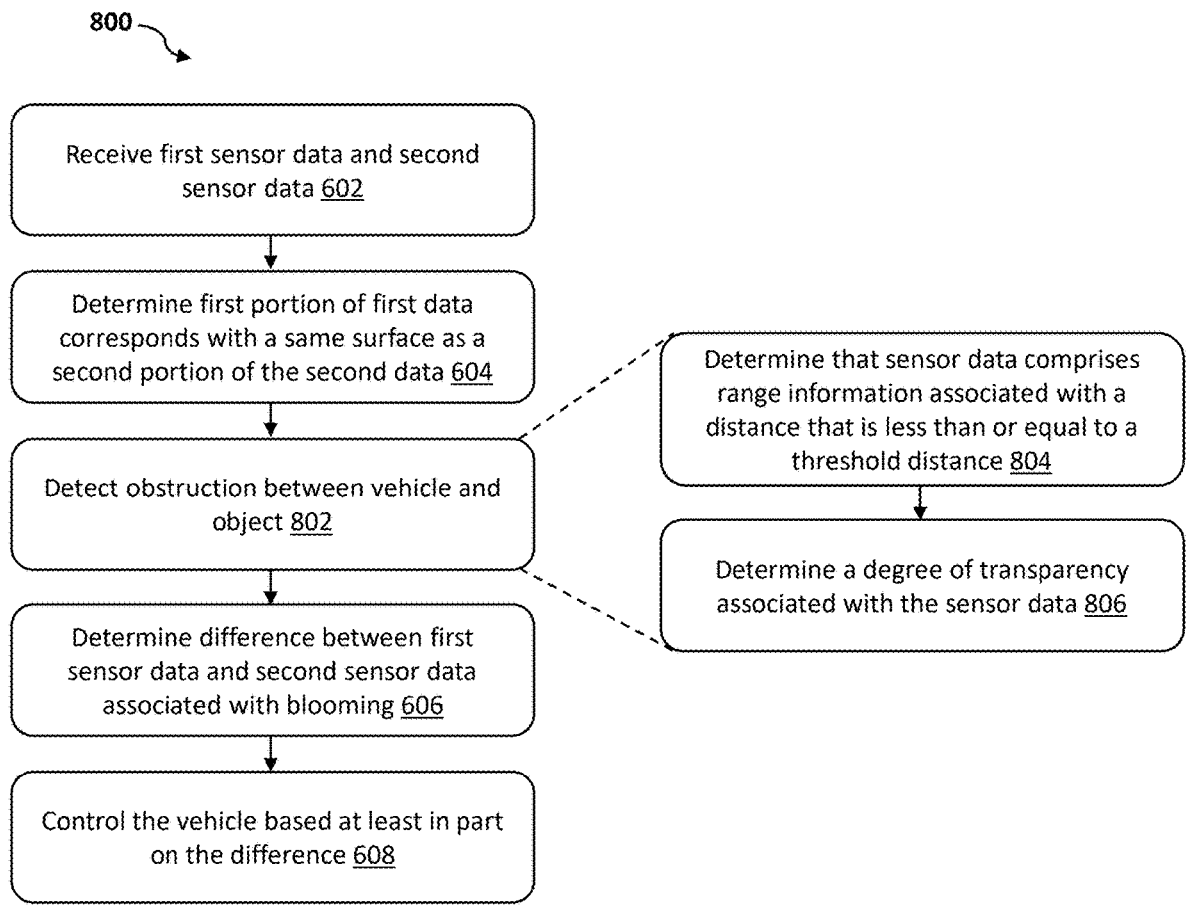
FIG. 8 is a flowchart illustrating a process according to techniques of the present disclosure.

FIG. 8 illustrates an alternative process 800, similar to process 600. Process 800 may comprise one or more of operations 602, 604, 606, and 608, similar to those operations described above. However, process 800 may also comprise additional operation 802. Operation 802 may comprise detecting an obstruction between the vehicle and the object based at least in part on the first sensor data or the second sensor data. For example, an obstruction may be detected on or proximal to an outer surface of the first scanning sensor and/or second scanning sensor. The obstruction may for example be water droplets and/or dirt. As discussed above in relation to FIG. 2, such obstructions may be associated with occurrence of blooming. Thus operation 802 may be considered an initial check that conditions associated with blooming are present. If they are, process 800 may proceed to operations 606 as discussed above. However, if conditions associated with blooming are not present, process 800 may halt without processing to operations 606 and 608. This may improve computation efficiency by omitting processing steps that are not required where blooming is not likely to occur. Additionally, this may improve safety by ensuring that lidar points are only deemed caused by blooming if the conditions that cause blooming are present. This may avoid omission of real, non-blooming sensor data, that should be considered by the planning component of the vehicle.

In some examples, operation 802 may comprise operation 804. Operation 804 may comprise determining that sensor data comprises range information associated with a distance that is less than or equal to a threshold difference. The threshold difference may be associated with dimensions of the respective scanning sensor. For example, the threshold difference may be based at least in part on a distance between a light emitter of the sensor and an outer surface of the sensor, such as an outer surface of a lens of the scanning sensor. In other words, it may be determined if any returns are associated with a short range, indicative of reflection from matter on or close to the outer surface of the scanning sensor.

Operation 802 may also comprise operation 806. Operation 806 may comprise determining a degree of transparency (or reflectivity) associated with the sensor data, for example associated with the returns with a range falling within the threshold distance. The degree of transparency may be determined from the intensity of the returns. The determined degree of transparency may be compared to a threshold transparency. In this way it may be termed in a short-range obstruction is substantially transparent. If so, it may be determined that the obstruction is likely caused by water droplets on the outer surface of the scanning sensor, and thus that conditions exist for blooming to occur.

Methods of detecting an obstruction for use in operation 802 are described in U.S. patent application Ser. No. 17/551,078, filed on Dec. 14, 2021, entitled Lidar Obstruction Detection, which is incorporated herein by reference in its entirety for all purposes.

The techniques discussed above have focused on software approaches for identifying that blooming has occurred in measured sensor data. In addition, or alternatively, some techniques of the present disclosure may use sensor hardware adaptations to reduce the likelihood of blooming.

Figure 9A:
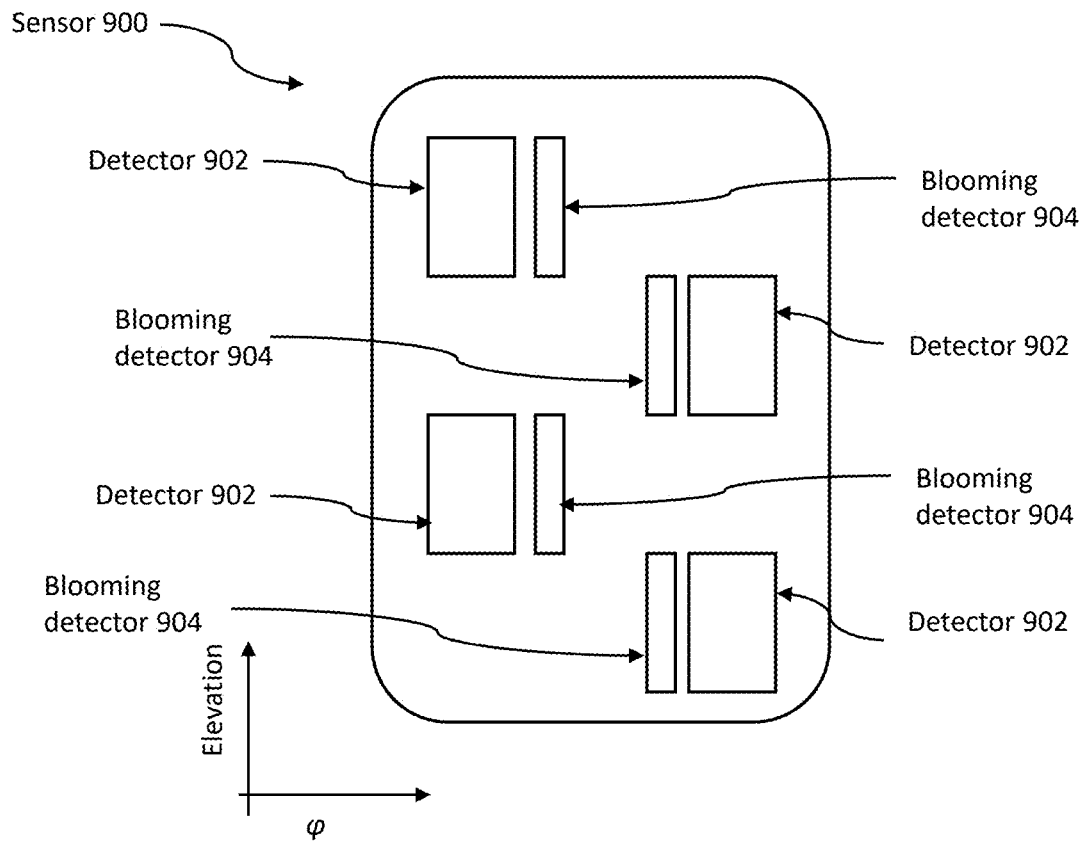
FIGS. 9A and 9B illustrate example sensors.

FIG. 9A illustrates an example of an imaging plane of a scanning sensor 900, such as a lidar sensor. Sensor 900 may comprise a plurality of detectors 902, similar to the detectors discussed in relation to FIG. 2. Each detector 902 may comprise a block of photodiodes arranged to detect light received from objects within a range of elevation angles and azimuthal angles. As illustrated, the detectors may be physically offset from each other in both the elevation and azimuthal directions. Such offsets may provide a wider combined field of view of the sensor 900, as well as reduce cross-talk between the detector blocks 902. In addition to the detectors 902 used for capturing the sensor data discussed above, sensor 900 may also comprise one or more blooming detectors 904. For example there may be a blooming detector 904 associated with each detector 902. A blooming detector may be positioned such that it is separated from its corresponding detector 902 along the azimuthal direction.

Blooming detectors may be or comprise photodetectors, similarly to the detectors 904. When deflections occur for example due to obstructions, as discussed in relation to FIG. 2, some deflected light may hit one or more of the blooming detectors 902. If a signal is detected by a blooming detector, it may be determined that blooming is occurring. The resulting sensor data may then be processed for example as described above to remove or reduce the effect of blooming in control of the vehicle. Equivalently the normal detectors 902 may be used to as blooming detectors by changing the azimuthal angle they are intended to collect light from, for example by rotating a mirror.

Figure 9B:
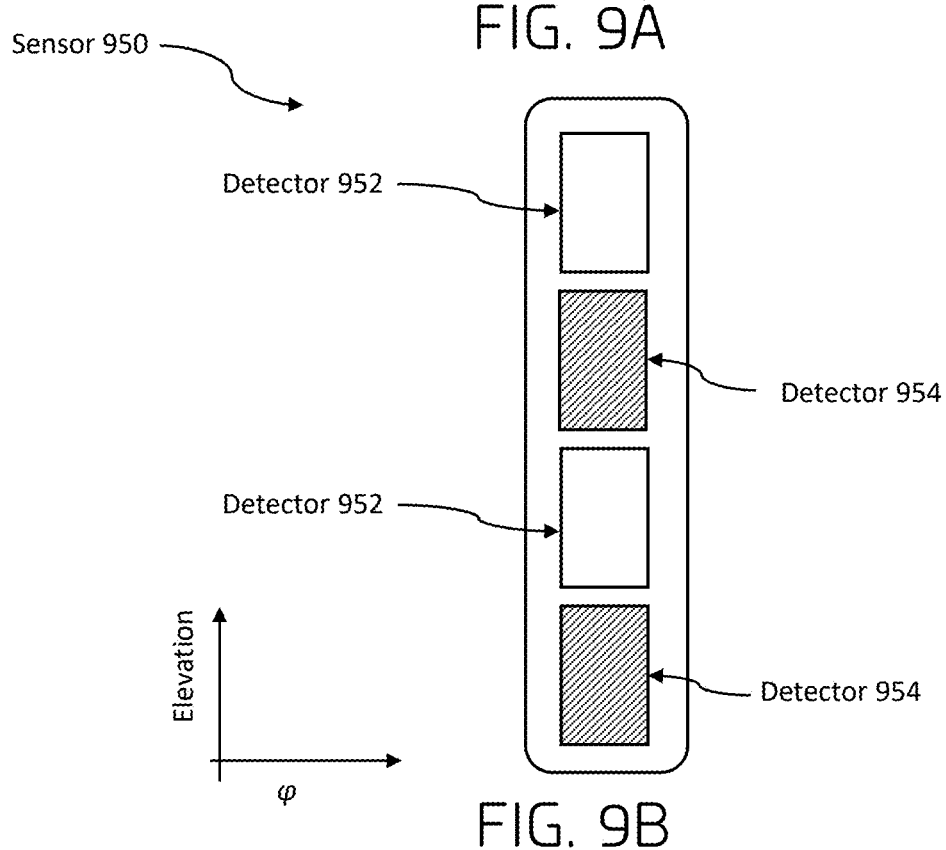

FIG. 9B illustrates an approach to prevent detection of blooming. FIG. 9B shows an example sensor 950, with detectors 952, 954 similar to the detectors 902 of FIG. 9A. Compared to sensor 900 of FIG. 9A, the detectors 952, 954 of sensor 950 are not separated from one another along the azimuthal axis. This may reduce the azimuthal field of view of the detector arrangement. Reducing the field of view may reduce the amount of deflected light beams that can be collected by the sensor (at a given position it its sweep), and thus may reduce blooming.

Although not illustrated, alternative techniques may apply a hydrophilic coating to an exterior of the sensor, such as an exterior surface of the ring lens 128 in FIG. 2. Conventionally, it may be expected that given water droplets may cause blooming, a hydrophobic surface would be preferable. However, a hydrophilic surface may reduce the contact angle of water droplets on the surface. Reducing the contact angle may reduce the range of deflection angles that can occur, and so may reduce the number of returns associated with blooming that can fall into the field of view of the detectors of a sensor.

The techniques discussed above have focused on using two scanning sensors to identify a difference in sensor data from the two sensor. In other techniques, however, sensor data may be received from a first sensor of a first type and a second sensor of a second type. The first type may be a scanning sensor, such as a lidar sensor. The second type may be a camera. A difference may be identified between the scanning sensor data associated with an object and the image of the object taken by the camera. The dimensions of the object in the image may be used to restrict scanning sensor data to returns associated with a particular area or volume of space. In this way scanning sensor data associated with blooming may be removed.

Figure 10:
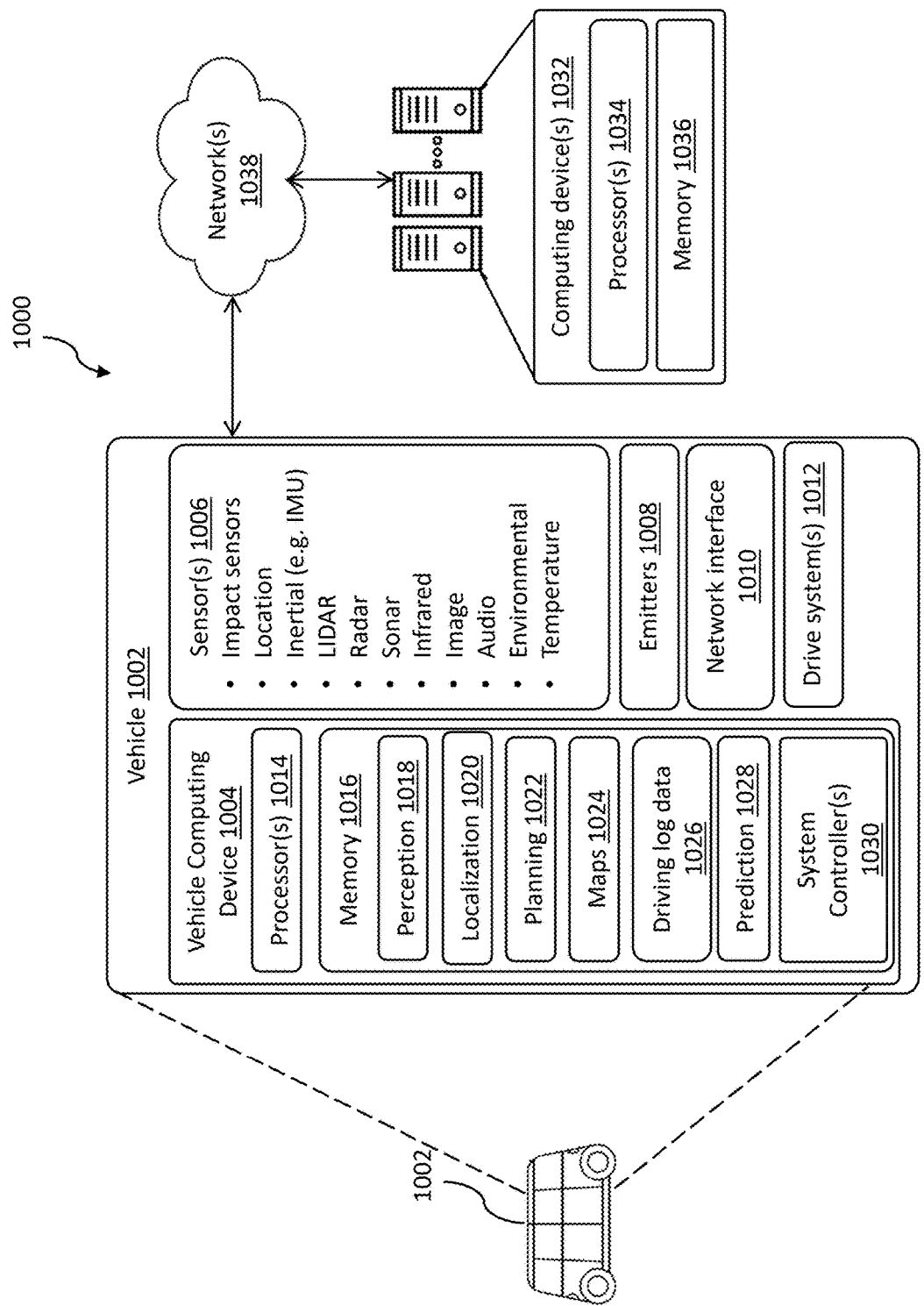
FIG. 10 is a block diagram of an example system for implementing the techniques described herein.

FIG. 10 illustrates a block diagram of an example system 1000 that implements the techniques discussed herein. In some instances, the example system 1000 may include a vehicle 1002. In some instances, the vehicle 1002 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 1002 may be a fully or partially autonomous vehicle having any other level or classification. Moreover, in some instances, the techniques described herein may be usable by non-autonomous vehicles as well.

The vehicle 1002 may include a vehicle computing device(s) 1004, sensor(s) 1006, emitter(s) 1008, network interface(s) 1010, and/or drive system(s) 1012. Sensor(s) 1006 may represent sensor(s) 112. The system 1000 may additionally or alternatively comprise computing device(s) 1032.

In some instances, the sensor(s) 1006 may represent sensor(s) 112 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 1006 may include multiple instances of each of these or other types of sensors. For instance, the radar sensors may include individual radar sensors located at the corners, front, back, sides, and/or top of the vehicle 1002. As another example, the cameras may include multiple cameras disposed at various locations about the exterior and/or interior of the vehicle 1002. The sensor(s) 1006 may provide input to the vehicle computing device(s) 1004 and/or to computing device(s) 1032.

The vehicle 1002 may also include emitter(s) 1008 for emitting light and/or sound, as described above. The emitter(s) 1008 may include interior audio and visual emitter(s) to communicate with passengers of the vehicle 1002. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 1008 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 1002 may also include network interface(s) 1010 that enable communication between the vehicle 1002 and one or more other local or remote computing device(s). The network interface(s) 1010 may facilitate communication with other local computing device(s) on the vehicle 1002 and/or the drive component(s) 1012. The network interface(s) 1010 may additionally or alternatively allow the vehicle to communicate with other nearby computing device(s) (e.g., other nearby vehicles, traffic signals, etc.). The network interface(s) 1010 may additionally or alternatively enable the vehicle 1002 to communicate with computing device(s) 1032 over a network 1038. In some examples, computing device(s) 1032 may comprise one or more nodes of a distributed computing system (e.g., a cloud computing architecture).

The vehicle 1002 may include one or more drive components 1012. In some instances, the vehicle 1002 may have a single drive component 1012. In some instances, the drive component(s) 1012 may include one or more sensors to detect conditions of the drive component(s) 1012 and/or the surroundings of the vehicle 1002. By way of example and not limitation, the sensor(s) of the drive component(s) 1012 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 1012. In some cases, the sensor(s) on the drive component(s) 1012 may overlap or supplement corresponding systems of the vehicle 1002 (e.g., sensor(s) 1006).

The drive component(s) 1012 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 1012 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 1012. Furthermore, the drive component(s) 1012 may also include one or more communication connection(s) that enable communication by the respective drive component with one or more other local or remote computing device(s).

The vehicle computing device(s) 1004 may include processor(s) 1014 and memory 1016 communicatively coupled with the one or more processors 1014. Computing device(s) 1032 may also include processor(s) 1034, and/or memory 1036. The processor(s) 1014 and/or 1034 may be any suitable processor capable of executing instructions to process data and perform operations as described herein. By way of example and not limitation, the processor(s) 1014 and/or 1034 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 1016 and/or 1036 may be examples of non-transitory computer-readable media. The memory 1016 and/or 1036 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1016 and/or memory 1036 may store a perception component 1018, localization component 1020, planning component 1022, map(s) 1024, driving log data 1026, prediction component 1028, and/or system controller(s) 1030—zero or more portions of any of which may be hardware, such as GPU(s), CPU(s), and/or other processing units.

The perception component 1018 may detect object(s) in in an environment surrounding the vehicle 1002 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 1018 is referred to as perception data. The perception component 1018 may be configured to associate a bounding region (or other indication) with an identified object. The perception component 1018 may be configured to associate a confidence score associated with a classification of the identified object with an identified object. In some examples, objects, when rendered via a display, can be colored based on their perceived class. The object classifications determined by the perception component 1018 may distinguish between different object types such as, for example, a passenger vehicle, a pedestrian, a bicyclist, motorist, a delivery truck, a semi-truck, traffic signage, and/or the like.

In at least one example, the localization component 1020 may include hardware and/or software to receive data from the sensor(s) 1006 to determine a position, velocity, and/or orientation of the vehicle 1002 (e.g., one or more of an x-, y-, z-position, roll, pitch, or yaw). For example, the localization component 1020 may include and/or request/receive map(s) 1024 of an environment and can continuously determine a location, velocity, and/or orientation of the autonomous vehicle 1002 within the map(s) 1024. In some instances, the localization component 1020 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 1020 may provide data to various components of the vehicle 1002 to determine an initial position of an autonomous vehicle for generating a trajectory and/or for generating map data, as discussed herein. In some examples, localization component 1020 may provide, to the perception component 1018, a location and/or orientation of the vehicle 1002 relative to the environment and/or sensor data associated therewith.

The planning component 1022 may receive a location and/or orientation of the vehicle 1002 from the localization component 1020 and/or perception data from the perception component 1018 and may determine instructions for controlling operation of the vehicle 1002 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 1030 and/or drive component(s) 1012 may parse/cause to be carried out, second instructions for the emitter(s) 1008 may be formatted according to a second format associated therewith).

The driving log data 1026 may comprise sensor data, perception data, and/or scenario labels collected/determined by the vehicle 1002 (e.g., by the perception component 1018), as well as any other message generated and or sent by the vehicle 1002 during operation including, but not limited to, control messages, error messages, etc. In some examples, the vehicle 1002 may transmit the driving log data 1026 to the computing device(s) 1032. The computing device(s) 1032 may identify one or more scenarios based at least in part on the log data, which may also comprise defining a scenario, wherein the scenarios are used to generate a playback simulation. For example, the computing device(s) 1032 may determine an environmental layout, a number, type, and a configuration of object(s) in the environment and/or associate this definition with one or more portions of log data associated with that scenario. In some examples, the driving log data 1026 may comprise (historical) perception data that was generated on the vehicle 1002 during operation of the vehicle.

The prediction component 1028 may generate one or more probability maps representing prediction probabilities of possible locations of one or more objects in an environment. For example, the prediction component 1028 may generate one or more probability maps for vehicles, pedestrians, animals, and the like within a threshold distance from the vehicle 1002. In some examples, the prediction component 1028 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 1022 may be communicatively coupled to the prediction component 1028 to generate predicted trajectories of objects in an environment. For example, the prediction component 1028 may generate one or more predicted trajectories for objects within a threshold distance from the vehicle 1002. In some examples, the prediction component 1028 may measure a trace of an object and generate a trajectory for the object based on observed and predicted behavior. Although prediction component 1028 is shown on a vehicle 1002 in this example, the prediction component 1028 may also be provided elsewhere, such as in a remote computing device as shown in FIG. 10. In some embodiments, a prediction component may be provided at both a vehicle and a remote computing device. These components may be configured to operate according to the same or a similar algorithm.

The memory 1016 and/or 1036 may additionally or alternatively store a mapping system, a planning system, a ride management system, etc. Although perception component 1018 and/or planning component 1022 are illustrated as being stored in memory 1016, perception component 1018 and/or planning component 1022 may include processor-executable instructions, machine-learned model(s) (e.g., a neural network), and/or hardware.

As described herein, the localization component 1020, the perception component 1018, the planning component 1022, the prediction component 1028, and/or other components of the system 1000 may comprise one or more ML models. For example, the localization component 1020, the perception component 1018, the planning component 1022, and/or the planning component 1028 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet 50, ResNet-101, VGG, DenseNet, PointNet, and the like. In some examples, the ML model discussed herein may comprise PointPillars, SECOND, top-down feature layers, and/or VoxelNet. Architecture latency optimizations may include MobilenetV2, Shufflenet, Channelnet, Peleenet, and/or the like. The ML model may comprise a residual block such as Pixor, in some examples.

Memory 1020 may additionally or alternatively store one or more system controller(s) 1030, which may be configured to control steering, propulsion, braking, safety, emitters, communication, and other systems of the vehicle 1002. These system controller(s) 1030 may communicate with and/or control corresponding systems of the drive component(s) 1012 and/or other components of the vehicle 1002.

It should be noted that while FIG. 10 is illustrated as a distributed system, in alternative examples, components of the vehicle 1002 may be associated with the computing device(s) 1032 and/or components of the computing device(s) 1032 may be associated with the vehicle 1002. That is, the vehicle 1002 may perform one or more of the functions associated with the computing device(s) 1032, and vice versa.

EXAMPLE CLAUSES

A: A system comprising: one or more processors; and one or more non-transitory computer-readable media storing instructions that, when executed, cause the system to perform operations comprising: receiving lidar data comprising first lidar returns captured by a first lidar sensor of an autonomous vehicle and second lidar returns captured by a second lidar sensor of the autonomous vehicle, the first lidar returns and second lidar returns associated with an object in an environment traversed by the autonomous vehicle; determining that a first portion of the first lidar data overlaps, as overlapping data, with a corresponding first portion of the second lidar data corresponding to an object; identifying a difference between a second portion of the first lidar returns and a corresponding second portion of the second lidar returns, wherein the difference comprises one or more of: a range difference, a variation of range as a function of azimuth or elevation, or a difference in azimuthal or elevational extent of the first lidar returns and second lidar returns associated with the object; determining, based at least in part on the overlapping data and the difference, that the second portion of the first lidar returns or the second portion of the second lidar returns corresponds to blooming; and controlling the autonomous vehicle based at least in part on the second portion of the first lidar returns or second portion of the second lidar returns corresponding to blooming.

B: The system of clause A, the operations comprising filtering, as filtered data, the lidar data based at least in part on the second portion of the first lidar returns or second portion of the second lidar returns corresponding to blooming.

C: The system of clause B, the operations comprising providing the filtered data to a perception component of the autonomous vehicle; and wherein the controlling the autonomous vehicle is based at least in part on an output of the perception component.

D: A method comprising: receiving lidar data comprising first lidar data collected by a first lidar sensor and second lidar data collected by a second lidar sensor of a vehicle; determining that a first portion of the first lidar data corresponds with a same surface as a second portion of the second lidar data; determining a difference, based at least in part on determining that the first portion corresponds with the same surface as the second portion, between the first lidar data and the second lidar data, the difference corresponding with blooming of the first lidar data or the second lidar data; identifying occurrence of blooming in the lidar data based at least in part on the difference between the first lidar data and the second lidar data; and controlling the vehicle based at least in part on identifying occurrence of blooming.

E: The method of clause D, wherein the determining that the first portion corresponds with the same surface as the second portion includes identifying an area of overlap between the first lidar data and the second lidar data associated with the object; and the method further comprises identifying occurrence of blooming in the lidar data based at least in part on the difference between the first lidar data and second lidar data and based at least in part on the area of overlap between the first lidar data and the second lidar data.

F: The method of clause E, comprising identifying the area of overlap based at least in part on comparing a range difference between a return of the first lidar data and a corresponding return of the second lidar data to a threshold range difference.

G: The method of clause E or F, comprising identifying the area of overlap based at least in part on intensities of returns of the first lidar data or second lidar data.

H: The method of any of clauses E to G, comprising identifying the area overlap as an extent of the object.

I: The method of any of clauses D to H, comprising: filtering the lidar data based at least in part on identifying occurrence of blooming in the lidar data.

J: The method of any of clauses D to I, wherein the difference corresponds with blooming extending in one or more of: an azimuthal direction substantially parallel to a distance between the first lidar sensor and the second lidar sensor; or an elevation direction substantially orthogonal to the distance between the first lidar sensor and the second lidar sensor.

K: The method of any of clauses D to J, wherein the difference is a difference between an azimuthal extent associated with the object in the first lidar data and an azimuthal extent associated with the object in the second lidar data.

L: The method of any of clauses D to K, wherein the difference is a difference between a first relationship relating range and azimuthal angle of the first lidar data and, a second relationship relating range and azimuthal angle of the second lidar data.

M: The method of clause D to L, comprising identifying that a gradient of the first relationship has a direction opposite to a gradient of the second relationship.

N: One or more non-transitory computer-readable media storing instructions executable by one or more processors, wherein the instructions, when executed, cause the one or more processors to perform operations comprising: receiving lidar data comprising first lidar data collected by a first lidar sensor and a second lidar data collected by a second lidar sensor of a vehicle; determining that a first portion of the first lidar data corresponds with a same surface as a second portion of the second lidar data; determining a difference, based at least in part on determining that the first portion corresponds with the same surface as the second portion, between the first lidar data and the second lidar data, the difference corresponding with blooming of the first lidar data or the second lidar data; identifying occurrence of blooming in the lidar data based at least in part on the difference between the first lidar data and the second lidar data; and controlling the vehicle based at least in part on identifying occurrence of blooming.

O: The one or more non-transitory computer-readable media of clause N, the operations comprising: detecting an obstruction between the vehicle and the object based at least in part on the first lidar data or the second lidar data, the obstruction associated with occurrence of blooming.

P: The one or more non-transitory computer-readable media of clause O, the operations comprising: identifying the obstruction as an obstruction associated with occurrence of blooming based at least in part on a range to the obstruction or a reflectivity of the obstruction.

Q: The one or more non-transitory computer-readable media of any of clauses N to P, the operations comprising: inputting the first lidar data and the second lidar data into a machine learned model, the machine learned model trained to identify differences between lidar data sets which correspond with blooming.

R: The one or more non-transitory computer-readable media of any of clauses N to Q, wherein the first lidar sensor and second lidar sensors detect from respective fields of view, wherein the respective fields of view at least partially overlap.

S: The one or more non-transitory computer-readable media of any of clauses N to R, wherein the first lidar sensor or second lidar sensor comprises a first photodetector and a second photodetector arranged to detect light reflected from objects in an environment around the vehicle with respective fields of view; and wherein the first photodetector is positioned within a distance of the second photodetector such that a portion of light travelling within the field of view of the first sensor is deflected by an obstruction into the field of view of the second photodetector.

T: The one or more non-transitory computer-readable media of any of clauses N to S, wherein the first lidar sensor or second lidar sensor is a mechanical lidar sensor or a solid-state lidar sensor.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:
1. A method comprising:
   receiving lidar data comprising first lidar data collected by a first lidar sensor and second lidar data collected by a second lidar sensor of a vehicle, wherein the first lidar sensor and the second lidar sensor are physically separate sensors mounted at different respective positions to the vehicle;

determining that a first portion of the first lidar data corresponds with a same surface as a second portion of the second lidar data;

determining a difference, based at least in part on determining that the first portion corresponds with the same surface as the second portion, between the first lidar data and the second lidar data, the difference corresponding with blooming of the first lidar data or the second lidar data, the difference corresponding with blooming extending in one or more of: an azimuthal direction parallel to a distance between the first lidar sensor and the second lidar sensor; or an elevation direction orthogonal to the distance between the first lidar sensor and the second lidar sensor;

identifying occurrence of blooming in the lidar data based at least in part on the difference between the first lidar data and the second lidar data; and controlling the vehicle based at least in part on identifying occurrence of blooming.

2. The method of claim 1, wherein the determining that the first portion corresponds with the same surface as the second portion includes identifying an area of overlap between the first lidar data and the second lidar data associated with an object; and the method further comprises identifying occurrence of blooming in the lidar data based at least in part on the difference between the first lidar data and second lidar data and based at least in part on the area of overlap between the first lidar data and the second lidar data.

3. The method of claim 2, comprising identifying the area of overlap based at least in part on comparing a range difference between a return of the first lidar data and a corresponding return of the second lidar data to a threshold range difference.

4. The method of claim 2, comprising identifying the area of overlap based at least in part on intensities of returns of the first lidar data or second lidar data.

5. The method of claim 2, comprising identifying the area overlap as one or more of an azimuthal extent or an elevational extent of the object.

6. The method of claim 1, comprising:
filtering the lidar data based at least in part on identifying occurrence of blooming in the lidar data.

7. One or more non-transitory computer-readable media storing instructions executable by one or more processors, wherein the instructions, when executed, cause the one or more processors to perform operations comprising:

receiving lidar data comprising first lidar data collected by a first lidar sensor and a second lidar data collected by a second lidar sensor of a vehicle, wherein the first lidar sensor and the second lidar sensor are physically separate sensors mounted at different respective positions to the vehicle;

determining that a first portion of the first lidar data corresponds with a same surface as a second portion of the second lidar data;

determining a difference, based at least in part on determining that the first portion corresponds with the same surface as the second portion, between the first lidar data and the second lidar data, the difference corresponding with blooming of the first lidar data or the second lidar data, the difference a difference between an azimuthal extent associated with an object in the first lidar data and an azimuthal extent associated with the object in the second lidar data;

identifying occurrence of blooming in the lidar data based at least in part on the difference between the first lidar data and the second lidar data; and controlling the vehicle based at least in part on identifying occurrence of blooming.

8. The one or more non-transitory computer-readable media of claim 7, the operations comprising:
detecting an obstruction between the vehicle and an object based at least in part on the first lidar data or the second lidar data, the obstruction associated with occurrence of blooming.

9. The one or more non-transitory computer-readable media of claim 8, the operations comprising:
identifying the obstruction as an obstruction associated with occurrence of blooming based at least in part on a range to the obstruction or a reflectivity of the obstruction.

10. The one or more non-transitory computer-readable media of claim 7, the operations comprising:
inputting the first lidar data and the second lidar data into a machine learned model, the machine learned model trained to identify differences between lidar data sets which correspond with blooming.

11. The one or more non-transitory computer-readable media of claim 7, wherein the first lidar sensor and second lidar sensors detect from respective fields of view, wherein the respective fields of view at least partially overlap.

12. The one or more non-transitory computer-readable media of claim 7, wherein the first lidar sensor or second lidar sensor is a mechanical lidar sensor or a solid-state lidar sensor.

13. The method of claim 1, wherein at least one of the first lidar sensor or the second lidar sensor comprises a scanning or rotating lidar sensor.

14. A system comprising:
one or more processors; and
one or more non-transitory computer-readable media storing instructions that, when executed, cause the system to perform operations comprising:

receiving lidar data comprising first lidar data collected by a first lidar sensor and second lidar data collected by a second lidar sensor of a vehicle, wherein the first lidar sensor and the second lidar sensor are physically separate sensors mounted at different respective positions to the vehicle;

determining that a first portion of the first lidar data corresponds with a same surface as a second portion of the second lidar data;

determining a difference, based at least in part on determining that the first portion corresponds with the same surface as the second portion, between the first lidar data and the second lidar data, the difference corresponding with blooming of the first lidar data or the second lidar data, wherein the difference is a difference between a first relationship relating range and azimuthal angle of the first lidar data and a second relationship relating range and azimuthal angle of the second lidar data;

identifying occurrence of blooming in the lidar data based at least in part on the difference between the first lidar data and the second lidar data; and controlling the vehicle based at least in part on identifying occurrence of blooming.

15. The system of claim 14, wherein:
the determining that the first portion corresponds with the same surface as the second portion includes identifying an area of overlap between the first lidar data and the second lidar data associated with an object; and the operations comprise identifying occurrence of blooming in the lidar data based at least in part on the difference between the first lidar data and second lidar data and based at least in part on the area of overlap between the first lidar data and the second lidar data.

16. The system of claim 15, the operations comprising identifying the area of overlap based at least in part on comparing a range difference between a return of the first lidar data and a corresponding return of the second lidar data to a threshold range difference.

17. The system of claim 15, the operations comprising identifying the area of overlap based at least in part on intensities of returns of the first lidar data or second lidar data.

18. The system of claim 15, the operations comprising identifying the area overlap as one or more of an azimuthal extent or an elevational extent of the object.

19. The system of claim 14, the operations comprising:
    filtering the lidar data based at least in part on identifying occurrence of blooming in the lidar data.

20. The system of claim 14, the operations comprising identifying that a gradient of the first relationship has a direction opposite to a gradient of the second relationship.

* * * * *